(12) United States Patent
Yazawa et al.

(10) Patent No.: US 11,841,091 B2
(45) Date of Patent: Dec. 12, 2023

(54) DIRECTIONAL CONTROL VALVE

(71) Applicants: NISHINA INDUSTRIAL CO., LTD., Nagano (JP); KABUSHIKI KAISHA TOYOTA JIDOSHOKKI, Kariya (JP)

(72) Inventors: Ryo Yazawa, Nagano (JP); Shigeto Nakajima, Nagano (JP); Akihito Nibe, Kariya (JP); Koichi Kinoshita, Kariya (JP)

(73) Assignees: NISHINA INDUSTRIAL CO., LTD., Nagano (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/851,495

(22) Filed: Jun. 28, 2022

(65) Prior Publication Data

US 2023/0003313 A1 Jan. 5, 2023

(30) Foreign Application Priority Data

Jul. 5, 2021 (JP) ................. 2021-111282

(51) Int. Cl.
*F16K 31/06* (2006.01)
*F16K 11/07* (2006.01)

(52) U.S. Cl.
CPC .......... *F16K 31/0693* (2013.01); *F16K 11/07* (2013.01); *F16K 31/0603* (2013.01)

(58) Field of Classification Search
CPC ............. F16K 31/0603; F16K 31/0679; F16K 31/0668; F16K 39/04; F16K 11/07; F15B 13/044; F15B 13/0877; F15B 13/0402
See application file for complete search history.

(56) References Cited

U.S. PATENT DOCUMENTS

| | | | | |
|---|---|---|---|---|
| 4,406,307 A | * | 9/1983 | Loup | ........................ F16K 47/00 |
| | | | | 137/625.65 |
| 5,284,220 A | * | 2/1994 | Shimizu | ................ F15B 13/044 |
| | | | | 91/429 |
| 5,640,987 A | | 6/1997 | Sturman | |

FOREIGN PATENT DOCUMENTS

| | | |
|---|---|---|
| DE | 3540553 A1 | 5/1987 |
| FR | 2784733 A1 | 4/2000 |
| JP | S63-208911 A | 8/1988 |
| JP | 2004-232764 A | 8/2004 |

OTHER PUBLICATIONS

Translation of DE3540553 (Year: 2023).*

(Continued)

*Primary Examiner* — Kelsey E Cary
(74) *Attorney, Agent, or Firm* — WHDA, LLP (57) ABSTRACT

A directional control valve includes: a housing having a cylindrical spool hole communicating with an inlet port letting a fluid from an external supply source at a predetermined pressure and an outlet port flowing the fluid to a working cylinder; a spool movable in the spool hole axially and changing an amount of flow of the fluid; a first solenoid driving section having a first needle coupled to or integral with a first end portion of the spool and driving the spool; and a second solenoid driving section having a second needle coupled to or integral with a second end portion of the spool and driving the spool, the directional control valve including a pressure equalization circuit equally applying a pressure to the end portions.

8 Claims, 3 Drawing Sheets

(56) References Cited

OTHER PUBLICATIONS

Extended European Search Report dated Nov. 17, 2022, issued in counterpart EP Application 22180050.1. (9 pages).
Office Action dated Sep. 20, 2023 issued in counterpart CA application No. 3,164,603. (5 pages).

* cited by examiner

PART III

CROSS-SECTIONAL VIEW OF PART V

FIG.6

DIRECTIONAL CONTROL VALVE

CROSS-REFERENCE TO RELATED APPLICATION

This application is based upon and claims the benefit of priority of the prior Japanese Patent Application No. P2021-111282, filed on Jul. 5, 2021, and the entire contents of which are incorporated herein by reference.

TECHNICAL FIELD

The present invention relates to a directional control valve.

BACKGROUND ART

A working vehicle such as a forklift or a construction machine is configured with a work device such as a fork or a bucket driven by a pressure fluid (hereinafter, often, simply referred to as "fluid"). To control driving of such a work device, a directional control valve that changes over or stops a flow direction of the fluid has been conventionally used.

In a working vehicle configured with a work device that generates high output power, in particular, a pressure and a flow rate of the fluid controlled by the directional control valve are set relatively high. A pilot type selector valve with a solenoid proportional pressure reducing valve suited for controlling such a fluid has been developed.

By way of example, a pilot type selector valve disclosed in PTL 1 (JP-A-2004-232764) is configured with a pressure reducing valve that generates a pilot pressure, a proportional solenoid that controls this pressure reducing valve, and a spool driven (moved) in response to the pilot pressure.

SUMMARY OF INVENTION

Technical Problem

The pilot type selector valve configured with the solenoid proportional pressure reducing valve disclosed in PTL 1 as an example can set the pressure and the flow rate of the fluid controlled by the spool high and is, therefore, suited for an aim to achieve the high power output of the work device. On the other hand, however, the pilot type selector valve becomes larger in size and larger in weight, and has a more complicated structure because of the provision of the solenoid proportional pressure reducing valve. Furthermore, the need to always generate the pilot pressure (standby pressure) for driving the spool causes degradation in the fuel consumption (including power consumption) performance of a vehicle equipped with the directional control valve. Therefore, it is a challenge to realize a selector valve capable of setting the pressure and the flow rate of the fluid controlled by the spool high without relying of a scheme to increase the size of the selector valve.

It is conceivable, for example, that configuring the selector valve to simply omit the solenoid proportional pressure reducing valve and to cause a solenoid driving section to directly drive (move) the spool, a small-size, a weight reduction, and a simplified structure can be realized without increasing the size. On the other hand, however, the inventors of the present application discovered that with the direct driving configurations, the higher the pressure and the flow rate of the fluid to be controlled, the more the spool is difficult to actuate in response to a control command, resulting in unstable fluid control.

Solution to Problems

The present invention has been accomplished under the circumstances, and an object of the present invention is to provide a directional control valve capable of setting high a pressure and a flow rate of a fluid to be controlled by a spool, avoiding an unstable operation of a spool, and ensuring stable fluid control in a configuration in which solenoid driving section directly drives the spool.

According to an aspect, the problems described above are solved by the following disclosed solution.

A directional control valve according to the disclosure includes: a housing having a cylindrical spool hole communicating with an inlet port that lets a fluid delivered from an external supply source at a predetermined pressure and an outlet port that lets the fluid to flow out to a working cylinder driving an external work device; a spool that is provided to be movable in the spool hole in an axial direction and that changes an amount of flow of the fluid; a first solenoid driving section having a first needle that is coupled to or integrally formed with a first end portion of the spool and that drives the spool; and a second solenoid driving section having a second needle that is coupled to or integrally formed with a second end portion of the spool and that drives the spool, the directional control valve including a pressure equalization circuit that equally applies a pressure to the first end portion and the second end portion of the spool.

Furthermore, the housing has a first discharge flow passage and a second discharge flow passage to one of which the fluid discharged by movement of a piston of the working cylinder is caused to flow in response to a moving direction of the piston, and as the pressure equalization circuit, one of or each of the housing and an outlet coupled to the housing in a stacked state has a connection flow passage connecting the first discharge flow passage to the second discharge flow passage, and a first pressure equalization flow passage and a second pressure equalization flow passage communicating with the connection flow passage, and the spool hole has a first pressure equalization chamber provided closer to the first end portion of the spool and communicating with the first pressure equalization flow passage to apply a pressure of the fluid in the connection flow passage to the first end portion of the spool, and a second pressure equalization chamber provided closer to the second end portion of the spool and communicating with the second pressure equalization flow passage to apply the pressure of the fluid in the connection flow passage to the second end portion of the spool.

Moreover, each of the first pressure equalization chamber and the second pressure equalization chamber has a circumferential groove engraved on an inner circumferential surface of the spool hole as a shape corresponding to a circumferential protrusion provided on an outer circumferential surface of a core used in a casting process of forming the spool hole.

Furthermore, the housing has a first stacking flow passage that communicates with the first pressure equalization chamber and a first stacking opening portion formed open in an opposite surface to a surface in which an opening portion that is an end portion of the first pressure equalization flow passage is provided, and a second stacking flow passage that communicates with the second pressure equalization chamber and a second stacking opening portion formed open in the opposite surface to the surface in which an opening portion that is an end portion of the second pressure equalization flow passage is provided.

Moreover, the fluid delivered from the external supply source is set to have a maximum pressure equal to or higher than 10 MPa and a maximum flow rate equal to or higher than 60 liters/min.

Advantageous Effect of the Invention

According to the directional control valve according to the disclosure, in a configuration in which the solenoid driving section directly drives the spool, the pressure and the flow rate of the fluid controlled by the spool can be set high. Furthermore, the directional control valve according to the disclosure is capable of avoiding an unstable operation of the spool and ensuring stable fluid control at a time of driving the spool.

DESCRIPTION OF EMBODIMENTS

Figure 1:
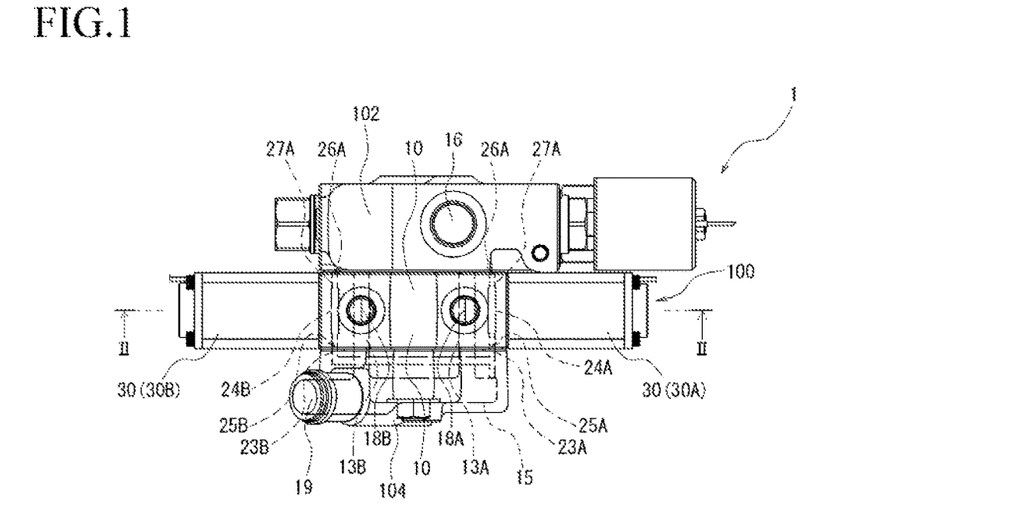
FIG. 1 is a front view illustrating an example of a directional control valve according to an embodiment of the present invention.
Figure 2:
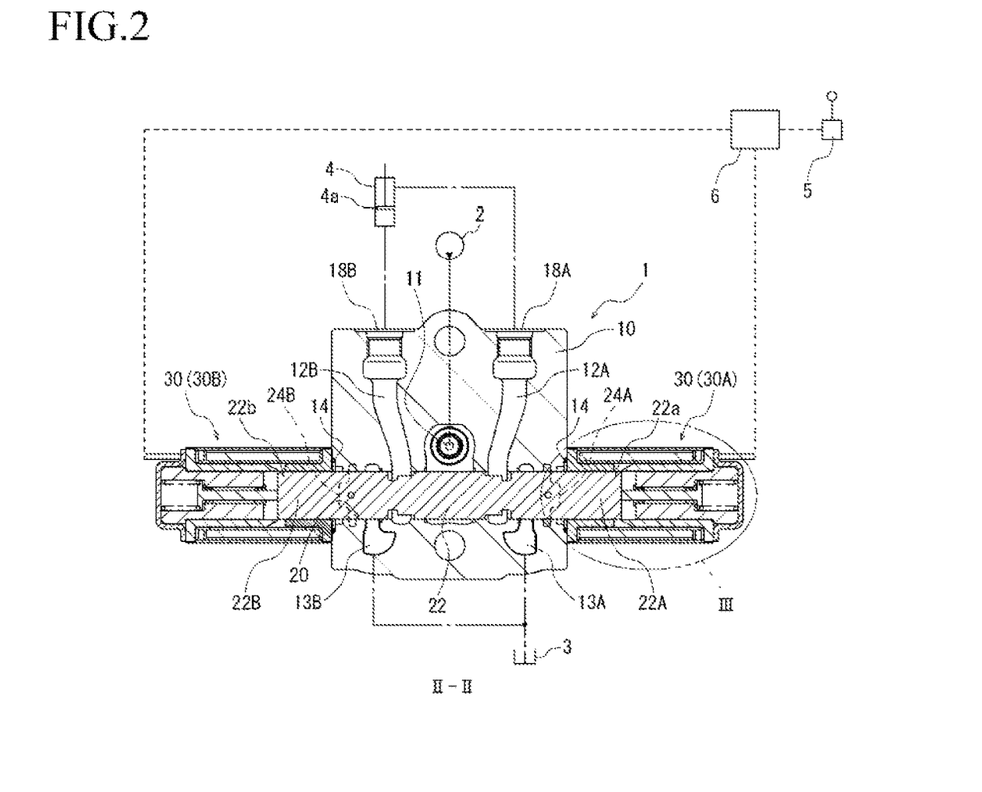
FIG. 2 is a cross-sectional view taken along line II-II of FIG. 1.
Figure 3:
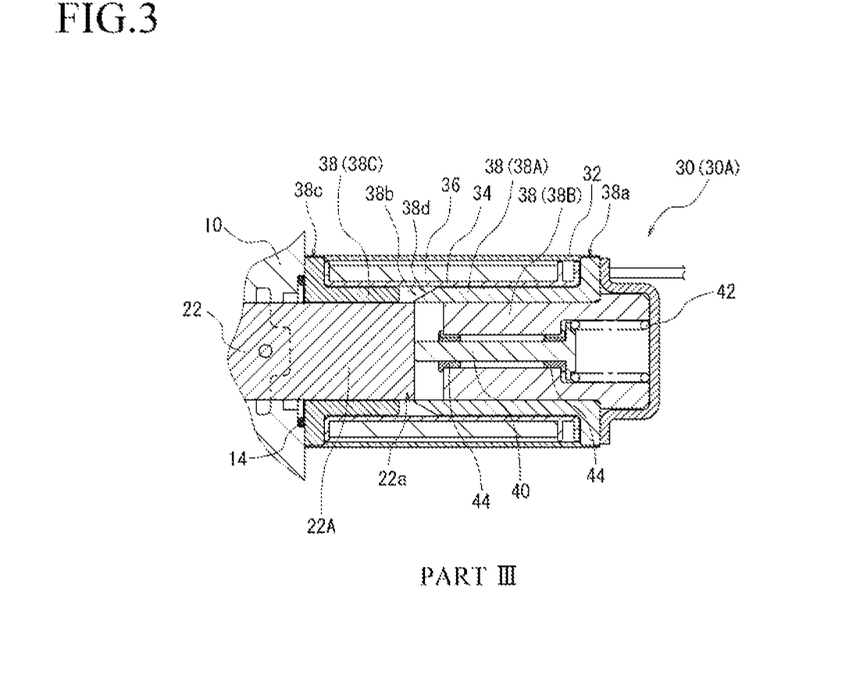
FIG. 3 is an enlarged view of part III of FIG. 2.
Figure 4:
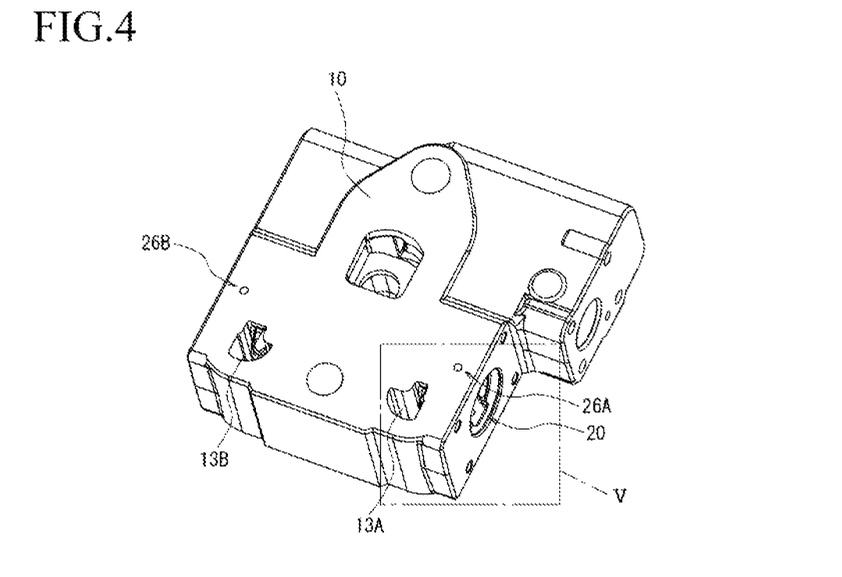
FIG. 4 is a perspective view illustrating an example of a housing for the directional control valve illustrated in FIG. 1.
Figure 5:
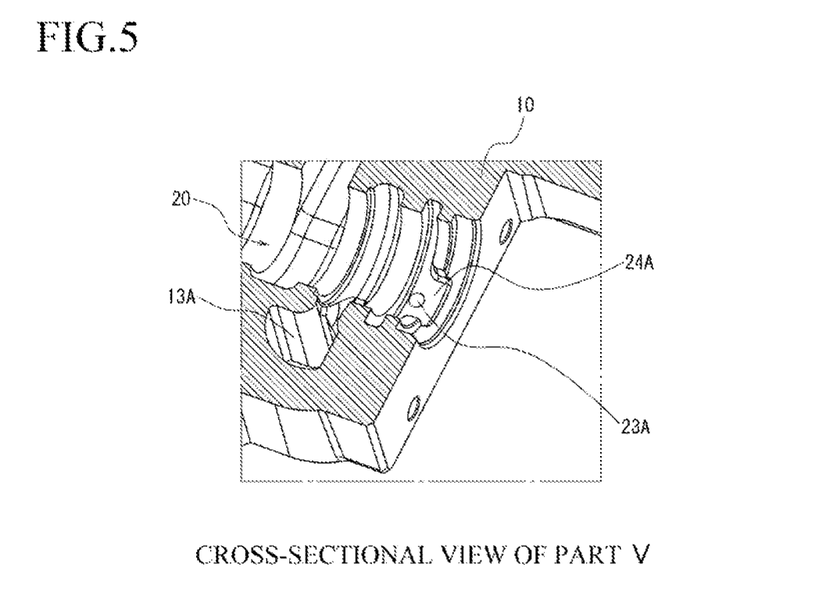
FIG. 5 is an enlarged cross-sectional view of part V of FIG. 4.

An embodiment of the present invention will be described hereinafter in detail with reference to the drawings. FIG. 1 is a front view (schematic diagram) illustrating an example of a directional control valve 1 according to the present embodiment. FIG. 2 is a cross-sectional view taken along line II-II of FIG. 1. In FIG. 2, however, peripheral devices and circuits are partially added for the sake of description. Furthermore, FIG. 3 is an enlarged view of part III of FIG. 2. Moreover, FIG. 4 is a perspective view (schematic diagram) of a housing 10, and FIG. 5 is an enlarged cross-sectional view of part V of FIG. 4 (perspective view at the same angle as that of FIG. 4). It is noted that members having the same function are denoted by the same reference sign and not repeatedly described in all the drawings for describing the embodiment.

The directional control valve 1 according to the present embodiment exercises control over work of a working cylinder that drives an external work device (e.g., work device used in a working vehicle), that is, changes over and stops a flow direction of a fluid used for the working cylinder 4 to work.

First, for solving the aforementioned problems, the inventors of the present application considered adopting, as a directional control valve, a direct acting selector valve, i.e., a selector valve configured with a solenoid driving section that directly moves a spool. This is because such configurations enable omission of a pressure reducing valve and a proportional solenoid for controlling the pressure reducing valve, so that it is possible to realize a small-size, a weight reduction, and a simplified structure as well as an improvement in a fuel consumption performance by reducing a pilot pressure (standby pressure) for driving the spool.

As a result of the consideration by trial manufacturing, experiments, and the like, the inventors of the present application found that the direct acting selector valve is capable of stably moving the spool when the pressure and the flow rate of the fluid are relatively low (in a case where a maximum pressure of the fluid is approximately equal to or lower than 10 MPa and a maximum flow rate is so-called a low flow rate or a medium flow rate approximately equal to or lower than 50 liters/min). However, it has become clear a problem that a spool moving operation becomes unstable in a case where the pressure and the flow rate of the fluid are relatively high (in a case where the maximum pressure of the fluid is approximately equal to or higher than 10 MPa and the maximum flow rate is a so-called high flow rate approximately equal to or higher than 60 liters/min).

After further study, the inventors has found that the problems result from the fact that the direct acting selector valve may generate a greatly low driving force, compared with the conventional solenoid proportional pressure reducing valve since the solenoid driving section of the direct acting selector valve is configured to directly drive (move) the spool. In other words, as the force driving the spool is lower, it is impossible to ignore an influence of the pressure of the fluid that is controlled by the spool and flows in a spool hole, specifically, the pressure of the fluid that is discharged from the working cylinder even if the pressure is quite low (e.g., as low as approximately 0.1 MPa) and that acts as a force moving the spool. As a result, an operation of the spool is not stable (specifically, a phenomenon that the spool does not move accurately in response to a control signal or the like occurs), causing unstable fluid control.

As a method of solving the problem, the solenoid driving section may be made larger in size (e.g., to have a diameter approximately equal to or greater than 80 mm) to enhance a thrust of a needle. This makes it possible to ignore the influence that the pressure of the fluid discharged from the working cylinder acts as the force moving the spool. However, this method leads to increasing in size.

The directional control valve 1 according to the present embodiment, therefore, is capable of solving the complex problems described so far by being configured as follows.

Overall configurations of the directional control valve 1 according to the present embodiment will first be described. As illustrated in FIGS. 1 and 2, the directional control valve 1 is disposed between a main hydraulic pump 2 that is an external supply source (which is a hydraulic source in this case) of a fluid (which is a pressurized fluid in this case) at a predetermined pressure, and a working cylinder 4 that actuates a work device such as a fork or a bucket. The directional control valve 1 acts to control a flow passage and a flow rate of the fluid supplied to and discharged from the working cylinder 4. This enables settings of a working direction, an amount of work, a working speed of the work device.

The directional control valve 1 is configured with a housing 10 and solenoid driving sections 30 provided on right and left side surfaces of the housing 10, respectively (hereinafter, a structurer including the housing 10 and the solenoid driving sections 30 are often referred to as "main body portion 100"). It is noted that in the present embodiment, the directional control valve 1 is also configured with an inlet 102 coupled to one surface (which will be described as "upper surface" on the basis of a layout of FIG. 1 for the sake of convenience of description) of the housing 10 while being stacked on the upper surface, and an outlet 104 coupled to the other surface (which will be described as "lower surface") on the basis of the layout of FIG. 1 for the sake of convenience of description) of the housing 10 while being stacked on the lower surface. By way of example, the inlet 102 is provided with an inlet port 16 that lets the fluid delivered from the external supply source (main hydraulic pump 2) to flow in. In addition, the main body portion 100 (housing 10 in this case) is provided with outlet ports 18A and 18B that let the fluid to flow out to the working cylinder 4. It is noted that the outlet ports 18A and 18B also serve as ports that let the fluid discharged from the working cylinder 4 to flow in. Moreover, the outlet 104 is provided with a tank port 19 that flows out the fluid discharged from the working cylinder 4 to a tank 3. However, the configurations of the directional control valve 1 are not limited to those described above, and the inlet port 16 and the tank port 19 may be directly provided in the housing 10 without providing the inlet and the outlet (not illustrated).

The housing 10 according to the present embodiment is provided with a spool hole 20 that is a cylindrical space part in communication with the inlet port 16, the outlet ports 18A and 18B, and the tank port 19. Furthermore, a spool 22 that is provided movable in an axial direction and that changes and stops an amount of flow of the fluid is accommodated in the spool hole 20. By way of example, the spool 22 and the spool hole 20 are each formed to have a circular cross-section, and the spool hole 20 is formed to penetrate from one side surface to the other side surface of the housing 10.

Furthermore, the solenoid driving sections 30 are members acting to drive (move) the spool 22. In the present embodiment, two solenoid driving sections (specifically, the first solenoid driving section 30A and the second solenoid driving section 30B) are disposed symmetrically on the two side surfaces of the housing 10, respectively. As an example of operation, when an operator operates an operation lever 5, then a drive signal in response to an operation is transmitted to the corresponding solenoid driving section 30 via a control section 6, and the solenoid driving section 30 is driven to move a needle, thereby actuating (moving) the spool 22 (details of an operating principle will be described later).

Furthermore, the housing 10 is provided with a supply flow passage 11 communicating with the inlet port 16, a first operation flow passage 12A and a second operation flow passage 12B communicating with the outlet ports 18A and 18B, respectively, and a first discharge flow passage 13A and a second discharge flow passage 13B communicating with the tank port 19. These flow passages are configured to communicate with the spool hole 20, and the supply flow passage 11 is, for example, disposed between the first operation flow passage 12A and the second operation flow passage 12B. In addition, the first operation flow passage 12A is disposed between the supply flow passage 11 and the first discharge flow passage 13A. Furthermore, the second operation flow passage 12B is disposed between the supply flow passage 11 and the second discharge flow passage 13B.

Here, the supply flow passage 11 is a flow passage that is connected to the main hydraulic pump 2 via the inlet port 16 and that supplies a fluid at a predetermined pressure (e.g., a high pressure of approximately 20 MPa) delivered from the main hydraulic pump 2. In addition, the first operation flow passage 12A and the second operation flow passage 12B are flow passages that are connected to the working cylinder 4 via the outlet ports 18A and 18B, respectively, and that supply a fluid at a predetermined pressure (e.g., a high pressure of approximately 20 MPa) to the working cylinder 4 and return a fluid at a predetermined pressure (e.g., a low pressure of approximately 2 MPa) discharged from the working cylinder 4. Furthermore, the first discharge flow passage 13A and the second discharge flow passage 13B are flow passages that are connected to the tank 3 via the tank port 19 and that deliver a fluid at a predetermined pressure (e.g., a low pressure of approximately 0.1 MPa) discharged from the working cylinder 4 and flowing.

In the present embodiment, with circuit configurations controlled with the spool hole 20 and the spool 22, the fluid discharged by movement of a piston 4a of the working cylinder 4 is delivered to one of the first operation flow passage 12A and the second operation flow passage 12B in response to a moving direction of the piston 4a (for example, when the piston 4a moves upward in FIG. 2, the fluid is discharged from the working cylinder 4 to the first operation flow passage 12A; and when the piston 4a moves downward in FIG. 2, the fluid is discharged from the working cylinder 4 to the second operation flow passage 12B.) Moreover, the fluid delivered to the first operation flow passage 12A flows only to the first discharge flow passage 13A (that is, not to the second discharge flow passage 13B). Conversely, the fluid delivered to the second operation flow passage 12B flows only to the second discharge flow passage 13B (that is, not to the first discharge flow passage 13A).

Next, the spool 22 is formed to have the circular cross-section and accommodated in the spool hole 20 of the housing 10 to be movable in the axial direction (more specifically, slidable with a predetermined fitting tolerance).

Although not illustrated, a notch that communicates the supply flow passage 11 with the first operation flow passage 12A and the second operation flow passage 12B, a notch that communicates the first operation flow passage 12A with the first discharge flow passage 13A, a notch that communicates the second operation flow passage 12B with the second discharge flow passage 13B, and the like are provided in an outer circumferential surface of the spool 22.

It is noted that a seal member 14 (e.g., an O-ring of rubber, elastomer, or the like) is provided in each of necessary locations.

Next, the solenoid driving sections 30 (first solenoid driving section 30A and second solenoid driving section 30B) moving the spool 22 are provided in two ends of the spool 22, respectively. Since the two solenoid driving sections 30A and 30B are identical in basic configurations, one solenoid driving section 30A (part III of FIG. 2) will be described in detail by way of example. It is noted that in the present embodiment, an example of configurations of a so-called "pull-type proportional solenoid" will be described as the solenoid driving section 30. However, configurations of a "push-type" or a "push-pull type" can be adopted (not illustrated). Furthermore, for a case where it is unnecessary to regulate the flow rate and sufficient only to change over a direction, or the like, "on-off solenoid" configurations can be adopted as an alternative to the "proportional solenoid" (not illustrated).

As illustrated in FIGS. 2 and 3, the solenoid driving section 30A according to the present embodiment includes, within a case 32, a coil 36 wound around a bobbin 34 while isolating a long conductor member, a fixed iron core 38 through which magnetic flux lines generated by excitation of the coil 36 pass, and a needle 22A (first needle) through which magnetic flux lines generated by excitation of the coil 36 pass, and which moves along an axial direction (that is, a direction along a central axis of the coil 36 wound around the bobbin 34, this same applies hereinafter) of the coil 36 by an attraction force generated due to the magnetic flux lines. It is noted that the needle 22A according to the present embodiment is formed integrally with the spool 22 (into an integral structure worked from one member). However, the needle 22A is not limited to this example and may be configured to be formed separately and coupled to a first end portion 22a of the spool 22 (end portion closer to the solenoid driving section 30A) (not illustrated).

The case 32 is a cylindrical member (that may be prismatic instead of being cylindrical) that accommodates the coil 36, the fixed iron core 38, the needle 22A, and the like, and is formed from, for example, a soft magnetic material such as carbon steel or free-cutting steel. This case 32 is fixed to a side surface of the housing 10 with bolts or the like (not illustrated).

The coil 36 is configured such that a long insulating-coated conductor member is wound around the bobbin 34. While the conductor member is, for example, a wire rod formed to have a cross-section of a circular shape, a square shape, or the like using a copper alloy or the like, the conductor member may be a tape material, a sheet material, or the like (not illustrated).

The fixed iron core 38 is a member that attracts the needle 22A through the magnetic flux lines generated by the excitation of the coil 36, and is formed from, for example, a soft magnetic material such as carbon steel or free-cutting steel. In the present embodiment, a base and a stator 38C that are disposed to be apart from each other in the axial direction of the coil 36 are provided as the fixed iron core 38. As the base here, a first base 38A formed to have a collar portion provided in a first end portion 38a to extend radially and a second base 38B fitted into the first base 38A are provided, both having a cylindrical shape. On the other hand, the stator 38C is formed to have a collar portion provided in a first end portion 38c to extend radially with a cylindrical shape.

Here, the first base 38A according to the present embodiment has a tapered surface 38d having an outer peripheral surface a diameter of which is larger toward the first end portion 38a, in a second end portion 38b of the first base 38A. With the configurations, it is possible to enhance a magnetic flux density in the second end portion 38b and obtain an advantageous effect of making an attraction force constant irrespective of a position of the needle 22A.

Moreover, a transmission member (pin) 40 supported movably in the axial direction via a bush 44 and an urging member 42 urging the transmission member 40 toward the needle 22A are provided in the second base 38B. By way of example, both the transmission member 40 and the bush 44 are formed from a non-magnetic material (such as a stainless alloy or a resin material). It is noted that the urging member 42 is a so-called return spring configured with, for example, a coil spring and applies a force to move the needle 22A in an opposite direction to a direction in which the needle 22A is attracted by the fixed iron core 38 at the time of the excitation of the coil 36.

The needle 22A is a member through which the magnetic flux lines generated when the coil 36 is excited pass and which moves along an axial direction of the coil 36 by the attraction force generated due to the magnetic flux lines and traveling to the fixed iron core 38. For example, the needle 22A is formed from a soft magnetic material such as carbon steel or free-cutting steel.

With the aforementioned configurations, exciting the coil 36 of the solenoid driving section 30A according to the present embodiment generates the force for the fixed iron core 38 to attract the needle 22A and generates an action to move the needle 22A in a predetermined direction (which is a direction from the second end portion 38b to the first end portion 38a of the first base 38A in this case). Moreover, demagnetizing the coil 36 dissipates the force for the fixed iron core 38 to attract the needle 22A and generates an action to move the needle 22A in a direction of returning the needle 22A to a neutral position by the urging force of the urging member 42. In the present embodiment, the urging force of the urging member 42 is transmitted to the needle 22A via the transmission member 40.

Since the solenoid driving section 30A according to the present embodiment is the "proportional solenoid," a magnetic field at an intensity in response to an operation amount of the operation lever 5 (i.e., the attraction force for the needle 22A) is generated. The needle 22A is, therefore, moved to a position where the attraction force and the urging force of the urging member 42 are kept in balance and stopped at the position. That is, a moving amount of the spool 22 is set in response to an operator's operation, whereby the flow rate of the fluid by the directional control valve 1 is set and a working speed of the working cylinder 4 is controlled.

On the other hand, the solenoid driving section 30B with a needle 22B (second needle) is similar in configurations to the solenoid driving section 30A with the needle 22A (first needle) and is not repeatedly described. It is noted that the needle 22B is formed integrally with the spool 22 similarly to the needle 22A. However, as a modification, the needle 22B may be coupled to a second end portion 22b of the spool 22 (end portion closer to the solenoid driving section 30B) (not illustrated).

As described above, the directional control valve 1 according to the present embodiment is a direct acting selector valve. Owing to this, because of a greatly low driving force that may be generated as compared with the conventional solenoid proportional pressure reducing valve, the directional control valve 1 possibly has problems that the operation of the spool 22 is not stable and that fluid control is unstable.

To address the problems, the directional control valve 1 according to the present embodiment is provided with a pressure equalization circuit applying the same pressure (i.e., equally applying a pressure) to the first end portion 22a and the second end portion 22b of the spool 22.

In the present embodiment, the pressure equalization circuit is configured as follows. Specifically, a connection flow passage 15 connecting the first discharge flow passage 13A to the second discharge flow passage 13B is provided in the outlet 104. In addition, a first pressure equalization flow passage 23A and a second pressure equalization flow passage 23B communicating with the connection flow passage 15 are provided continuously on both sides of the outlet 104 and the housing 10. Furthermore, a first pressure equalization chamber 24A (refer to FIG. 4 and the like) that is provided closer to the first end portion 22a of the spool 22 and that communicates with the first pressure equalization flow passage 23A is provided in the housing 10 (spool hole 20). This first pressure equalization chamber 24A acts to deliver the fluid in the connection flow passage 15 toward the first end portion 22a of the spool 22. Therefore, the pressure of the fluid in the connection flow passage 15 is applied to the first end portion 22a of the spool 22 (i.e., applied to the spool 22 in a direction from the first end portion 22a to the second end portion 22b). Likewise, a second pressure equalization chamber 24B (configured symmetrically with the first pressure equalization chamber 24A illustrated in FIG. 4 and the like) that is provided closer to the second end portion 22b of the spool 22 and that communicates with the second pressure equalization flow passage 23B is provided. This second pressure equalization chamber 24B acts to deliver the fluid in the connection flow passage 15 toward the second end portion 22b of the spool 22. Therefore, the pressure of the fluid in the connection flow passage 15 is applied to the second end portion 22b of the spool 22 (i.e., applied to the spool 22 in a direction from the second end portion 22b to the first end portion 22a). By way of example, the first pressure equalization flow passage 23A is provided as an independent flow passage that does not directly communicate with the first discharge flow passage 13A in the housing 10, and the second pressure equalization flow passage 23B is provided as an independent flow passage that does not directly communicate with the second discharge flow passage 13B in the housing 10. Furthermore, the first pressure equalization flow passage 23A and the second pressure equalization flow passage 23B are substantially identical in structure (structured line-symmetric with respect to a central position in the axial direction of the spool hole 20 in the housing 10), and the first pressure equalization chamber 24A and the second pressure equalization chamber 24B are substantially identical in structured (structured line-symmetric with respect to the central position in the axial direction of the spool hole 20 in the housing 10). However, the present embodiment is not limited to the configurations.

With the configurations, it is possible to equally apply the pressure to the first end portion 22a and the second end portion 22b of the spool 22. More specifically, the fluid discharged from the working cylinder 4 under control of the spool 22 acts as a force to move the spool 22 (in the direction from the first end portion 22a to the second end portion 22b) when flowing through the first discharge flow passage 13A from the first operation flow passage 12A via within the spool hole 20. Likewise, the fluid discharged from the working cylinder 4 under control of the spool 22 acts as a force to move the spool 22 (in the direction from the second end portion 22b to the first end portion 22a) when flowing through the second discharge flow passage 13B from the second operation flow passage 12B via within the spool hole 20. In either case, the pressure generated by the fluid in the connection flow passage 15 can be applied simultaneously to both the first end portion 22a and the second end portion 22b of the spool 22. The pressure here is equal to the pressure (e.g., low pressure of approximately 0.1 MPa) of the fluid flowing from the first discharge flow passage 13A and the second discharge flow passage 13B into the connection flow passage 15 (including an ignorable slight difference).

It is thereby possible to eliminate an influence of the fluid that acts as the force to move the spool 22 at the time of flowing in the spool hole 20 or reduce the influence to an ignorable degree, so that it is possible to avoid the unstable operation of the spool 22 and stabilize the fluid control.

As a result, even when the pressure and the flow rate of the fluid are set high (on the assumption herein that a maximum pressure of the fluid is equal to or higher than 10 MPa and a maximum flow rate is approximately 60 to 160 liters/min), it is possible to realize configurations of directly and stably moving the spool 22 without relying on the solution to increasing in size of the solenoid driving sections 30.

As modifications of the pressure equalization circuit, the pressure equalization circuit may be configured such that the connection flow passage 15 is provided continuously in both the outlet 104 and the housing 10, or such that the connection flow passage 15, the first pressure equalization flow passage 23A, and the second pressure equalization flow passage 23B are provided in the housing 10 (not illustrated).

Moreover, as characteristic configurations of the directional control valve 1 according to the present embodiment, each of the first pressure equalization chamber 24A and the second pressure equalization chamber 24B has a circumferential groove engraved on an inner circumferential surface of the spool hole 20 as a shape corresponding to a circumferential protrusion provided on an outer circumferential surface of a foundry core (not illustrated) used in a casting process of forming the spool hole 20.

With the configurations, at a time of forming the spool hole 20 by casting, it is possible to form the first pressure equalization chamber 24A and the second pressure equalization chamber 24B simultaneously. In other words, it is possible to reduce the number of machining man-hours and shorten takt time because of no need to form the spool hole 20 by separate machining (cutting).

Furthermore, the housing 10 has a first stacking flow passage 27A that communicates with the first pressure equalization chamber 24A and a first stacking opening portion 26A formed open in an opposite surface to a surface in which an opening portion (first opening portion 25A) that is an end portion of the first pressure equalization flow passage 23A is provided, and a second stacking flow passage 27B that communicates with the second pressure equalization chamber 24B and a second stacking opening portion 26B formed open in the opposite surface to the surface in which an opening portion (second opening portion 25B) that is an end portion of the second pressure equalization flow passage 23B is provided. At this time, it is more preferable that the first opening portion 25A and the first stacking opening portion 26A are provided at the same position and that the second opening portion 25B and the second stacking opening portion 26B are provided at the same position in a plan view.

Figure 6:
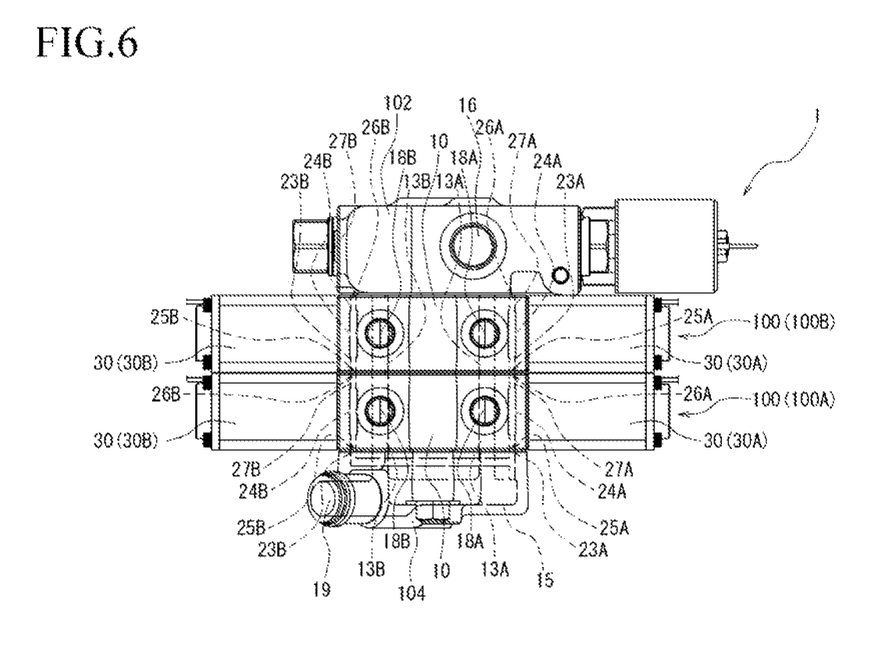
FIG. 6 is a front view illustrating another example of the directional control valve according to the embodiment of the present invention.

With the configurations, as in another embodiment illustrated in FIG. 6, configurations of stacking a plurality of main body portions 100 between the inlet 102 and the outlet 104 can be realized. Therefore, it is possible to easily construct the directional control valve 1 with the number of stacked main body portions 100 increased or decreased depending on the number of installed working cylinders 4 to be controlled. While FIG. 6 illustrates configurations with two main body portions 100A and 100B as an example, the number of main body portions 100 is not limited to two but may be three or more depending on the number of installed working cylinders 4 (not illustrated).

Moreover, it is possible to simultaneously form the first opening portion 25A, the first pressure equalization flow passage 23A (constituent element in the housing 10), the first stacking flow passage 27A, and the first stacking opening portion 26A by one drilling. Likewise, it is possible to simultaneously form the second opening portion 25B, the second pressure equalization flow passage 23B (constituent element in the housing 10), the second stacking flow passage 27B, and the second stacking opening portion 26B by one drilling. Therefore, it is possible to reduce the number of machining man-hours and shorten the takt time.

As described so far, the directional control valve according to the disclosure, which is configured to cause the solenoid driving sections to directly drive the spool, is capable of setting the pressure and the flow rate of the fluid controlled by the spool high without relying on the scheme of increasing in size of the solenoid driving sections. Additionally, the directional control valve according to the disclosure is capable of avoiding the unstable operation of the spool and ensuring the stable fluid control at the time of driving the spool.

Furthermore, realizing configurations without the solenoid proportional pressure reducing valve not only enables small-sized, the weight reduction, and simple configurations but also eliminates the standby pressure for control, thus making it possible to improve a fuel consumption (power consumption) performance of a vehicle equipped with the directional control valve.

Needless to say, the present invention is not limited to the embodiments described so far and can be changed and modified in various manners without departing from the present invention.

What is claimed is:

1. A directional control valve comprising:
a housing having a cylindrical spool hole communicating with an inlet port that lets a fluid delivered from an external supply source at a predetermined pressure and an outlet port that lets the fluid to flow out to a working cylinder driving an external work device;
a spool that is provided to be movable in the spool hole in an axial direction and that changes an amount of flow of the fluid;
a first solenoid driving section having a first needle that is coupled to or integrally formed with a first end portion of the spool and that drives the spool; and
a second solenoid driving section having a second needle that is coupled to or integrally formed with a second end portion of the spool and that drives the spool, wherein
the directional control valve comprises a pressure equalization circuit that equally applies a pressure to the first end portion and the second end portion of the spool, wherein
the housing has a first discharge flow passage and a second discharge flow passage to one of which the fluid discharged by movement of a piston of the working cylinder is caused to flow in response to a moving direction of the piston, and
as the pressure equalization circuit, one of or each of the housing and an outlet coupled to the housing in a stacked state has a connection flow passage connecting the first discharge flow passage to the second discharge flow passage, and a first pressure equalization flow passage and a second pressure equalization flow passage communicating with the connection flow passage, and the spool hole has a first pressure equalization chamber provided closer to the first end portion of the spool and communicating with the first pressure equalization flow passage to apply a pressure of the fluid in the connection flow passage to the first end portion of the spool, and a second pressure equalization chamber provided closer to the second end portion of the spool and communicating with the second pressure equalization flow passage to apply the pressure of the fluid in the connection flow passage to the second end portion of the spool; and wherein
the housing has a first stacking flow passage that communicates with the first pressure equalization chamber and a first stacking opening portion formed open in an opposite surface to a surface in which an opening portion that is an end portion of the first pressure equalization flow passage is provided, and a second stacking flow passage that communicates with the second pressure equalization chamber and a second stacking opening portion formed open in the opposite surface to the surface in which an opening portion that is an end portion of the second pressure equalization flow passage is provided.

2. The directional control valve according to claim 1, wherein
each of the first pressure equalization chamber and the second pressure equalization chamber has a circumferential groove engraved on an inner circumferential surface of the spool hole as a shape corresponding to a circumferential protrusion provided on an outer circumferential surface of a core used in a casting process of forming the spool hole.

3. The directional control valve according to claim 2, wherein
the housing has a first stacking flow passage that communicates with the first pressure equalization chamber and a first stacking opening portion formed open in an opposite surface to a surface in which an opening portion that is an end portion of the first pressure equalization flow passage is provided, and a second stacking flow passage that communicates with the second pressure equalization chamber and a second stacking opening portion formed open in the opposite surface to the surface in which an opening portion that is an end portion of the second pressure equalization flow passage is provided.

4. The directional control valve according to claim 3, wherein
the fluid delivered from the external supply source is set to have a maximum pressure equal to or higher than 10 MPa and a maximum flow rate equal to or higher than 60 liters/min.

5. The directional control valve according to claim 2, wherein
the fluid delivered from the external supply source is set to have a maximum pressure equal to or higher than 10 MPa and a maximum flow rate equal to or higher than 60 liters/min.

6. The directional control valve according to claim 1, wherein
the fluid delivered from the external supply source is set to have a maximum pressure equal to or higher than 10 MPa and a maximum flow rate equal to or higher than 60 liters/min.

7. The directional control valve according to claim 1, wherein
the fluid delivered from the external supply source is set to have a maximum pressure equal to or higher than 10 MPa and a maximum flow rate equal to or higher than 60 liters/min.

8. The directional control valve according to claim 1, wherein
the fluid delivered from the external supply source is set to have a maximum pressure equal to or higher than 10 MPa and a maximum flow rate equal to or higher than 60 liters/min.

* * * * *